(12) United States Patent
Shirur et al.

(10) Patent No.: US 12,509,014 B2
(45) Date of Patent: Dec. 30, 2025

(54) SYSTEMS AND METHOD FOR ESTIMATING AND MONITORING OCCUPANT INJURY LEVEL IN REAL TIME IN VEHICLE CRASHES

(71) Applicants: Technische Hochschule Ingolstadt, Ingolstadt (DE); Technische Universität Braunschweig, Braunschweig (DE)

(72) Inventors: Naveen Shirur, Ingolstadt (DE); Christian Birkner, Ingolstadt (DE); Roman Henze, Braunschweig (DE); Thomas Deserno, Braunschweig (DE)

(73) Assignee: TECHNISCHE HOCHSCHULE INGOLSTADT, Ingolstadt (DE)

( * ) Notice: Subject to any disclaimer, the term of this patent is extended or adjusted under 35 U.S.C. 154(b) by 100 days.

(21) Appl. No.: 18/558,631

(22) PCT Filed: May 3, 2022

(86) PCT No.: PCT/EP2022/061751
§ 371 (c)(1),
(2) Date: Nov. 2, 2023

(87) PCT Pub. No.: WO2022/238167
PCT Pub. Date: Nov. 17, 2022

(65) Prior Publication Data
US 2024/0227714 A1 Jul. 11, 2024

(30) Foreign Application Priority Data
May 11, 2021 (EP) ..................... 21173307

(51) Int. Cl.
*B60R 21/01* (2006.01)
*B60R 21/015* (2006.01)

(52) U.S. Cl.
CPC .. *B60R 21/01508* (2014.10); *B60R 21/01516* (2014.10)

(58) Field of Classification Search
CPC ........ B60R 21/01508; B60R 21/01516; B60R 21/0152
See application file for complete search history.

(56) References Cited

U.S. PATENT DOCUMENTS 6,513,829 B1 2/2003 Zumpano
9,367,636 B2 6/2016 Kim et al.
(Continued)

FOREIGN PATENT DOCUMENTS

CN 107298070 A 10/2017
EP 0965500 A2 12/1999
(Continued)

OTHER PUBLICATIONS

International Search Report and Written Opinion of International Application No. PCT/EP2022/061751, mail date Sep. 9, 2022, 16 pages.
(Continued)

*Primary Examiner* — Joseph J Dallo
(74) *Attorney, Agent, or Firm* — Grossman, Tucker, Perreault & Pfleger, PLLC

(57) ABSTRACT

The invention refers to a crash monitoring system (10) for a vehicle (50) equipped with an airbag (52). The system (10) comprises an occupant monitoring system (12) configured for providing a mass value corresponding to a mass of the head (42) of an occupant (40) of the vehicle (50); an airbag pressure sensor (14) configured for providing a pressure value corresponding to a gas pressure within the airbag (52) of the vehicle (50); an airbag contact sensor (16) configured for providing a contact area value corresponding to a contact area at which the head (42) of the occupant (40) of the
(Continued)

vehicle (50) contacts the airbag (52) of the vehicle (50); and a processing unit (18) configured for providing an acceleration value corresponding to an acceleration of the head (42) of the occupant (40) of the vehicle (50) based on the mass value, the pressure value and the contact area value. The invention further refers to an airbag system and a vehicle comprising such an occupant monitoring system and to a corresponding method of generating an acceleration value corresponding to an acceleration of the head (42) of an occupant (40) of a vehicle (50) in a crash situation.

20 Claims, 3 Drawing Sheets

(56) References Cited

U.S. PATENT DOCUMENTS

| | | | |
|---|---|---|---|
| 9,676,363 B1 | 6/2017 | Deng et al. | |
| 2006/0192367 A1 | 8/2006 | Zumpano | |
| 2007/0096445 A1* | 5/2007 | Breed | B60N 2/0031 280/801.1 |
| 2007/0096446 A1* | 5/2007 | Breed | B60R 21/2338 280/735 |
| 2007/0120347 A1* | 5/2007 | Breed | B60N 2/0022 280/735 |
| 2007/0132219 A1* | 6/2007 | Breed | B60R 21/0152 280/735 |
| 2007/0132220 A1* | 6/2007 | Breed | B60R 21/01516 701/45 |
| 2007/0135982 A1* | 6/2007 | Breed | E05F 15/43 701/36 |
| 2007/0251749 A1* | 11/2007 | Breed | G01S 7/539 177/144 |
| 2008/0036185 A1* | 2/2008 | Breed | B60N 2/0026 280/734 |
| 2008/0036252 A1* | 2/2008 | Breed | B60N 2/2806 297/217.2 |
| 2008/0042408 A1* | 2/2008 | Breed | B60N 2/829 280/734 |
| 2008/0189053 A1* | 8/2008 | Breed | G01S 7/417 702/41 |

FOREIGN PATENT DOCUMENTS

| | | | | |
|---|---|---|---|---|
| EP | 4088976 A1 * | 11/2022 | ....... | B60R 21/01508 |
| WO | 2004043747 A1 | 5/2004 | | |
| WO | WO-2022238167 A1 * | 11/2022 | ....... | B60R 21/01508 |

OTHER PUBLICATIONS

Bonyár, et al., "A review on current eCall systems for autonomous car accident detection", Conference Paper, May 2017, Proceedings of the 40th IEEE International Spring Seminar on Electronics Technology, Research Gate, 9 pages.

Deserno, "Transforming Smart Vehicles and Smart Homes into Private Diagnostic Spaces", APIT, Jan. 17-19, 2020, Bali Island Indonesia, pp. 165-171.

Eppinger, et al., "Development of Improved Injury Criteria for the Assessment of Advanced Automotive Restraint Systems—II", National Highway Traffic Safety Administration, Nov. 1999, 180 pages.

Shirur, et al., "Effect of Airbag Deployment Phases on Tactile Occupant Detection Sensor", 2020, 5 pages.

Shojaati, "Correlation between injury risk and impact severity index ASI", 3rd Swiss Transport Research Conference Paper Session Safety, Ascona, Mar. 19-21, 2003, pp. 1-10.

Wang, et al., "In-Vehicle Respiratory Rate Estimation Using Accelerometers", pHealth 2019, IOS Press, 2019, pp. 97-102.

Wang, et al., "The Vehicle as a Diagnostic Space: Efficient Placement of Accelerometers for Respiration Monitoring During Driving", ICT for Health Science Research, The European Federation for Medical Informatics (EFMI) and IOS Press, 2019, pp. 206-210.

* cited by examiner

SYSTEMS AND METHOD FOR ESTIMATING AND MONITORING OCCUPANT INJURY LEVEL IN REAL TIME IN VEHICLE CRASHES

FIELD OF THE INVENTION

The present invention is in the field of passive vehicle safety. In particular, the invention refers to a crash monitoring system for a vehicle equipped with an airbag that is configured for determining an acceleration undergone by the head of a vehicle occupant in a crash situation in real time and to an airbag system comprising such a crash monitoring system as well as to a related vehicle and method.

BACKGROUND OF THE INVENTION

Since their introduction in the 1970s and 1980s, airbags have become a central component of occupant protection in vehicles and contribute to saving thousands of lives every year. According to estimates, over 2700 lives were saved in year 2017 only in the US thanks to the use of airbags in vehicles that were involved in crashes. The use of airbags, in particular of front airbags, side airbags and head airbags, has meanwhile become standard and is, together with the use of the seat belt, a core element of passive safety standard equipment in most vehicles available in the market.

The purpose of the airbag is to provide a vehicle occupant with a soft cushioning and restraint during a crash event. In a crash event, the effectiveness of the airbag or airbags of the vehicle can highly determine the injuries suffered by the occupants of the vehicle, in particular in their upper body, especially in the head.

Crash tests and crash simulations are mandatory for the commercialisation of vehicles in most countries and are standardly performed as part of the development of vehicle models. However, it remains challenging to reliably estimate real injury levels in actual crash situations.

Therefore, there is room for technical improvement for reliably monitoring, estimating and/or using real injury levels for the occupants of a vehicle involved in a vehicle crash.

SUMMARY OF THE INVENTION

The present invention aims at reliably monitoring, estimating and/or using, in real time, injury levels of occupants of a vehicle involved in a vehicle crash, both during the crash and in its aftermath. This aim is achieved by means of a crash monitoring system according to claim 1, by an airbag system according to claim 8, by a vehicle according to claim 10 and by a method according to claim 11. Preferred embodiments of the invention are defined in the appended dependent claims.

A first aspect of the invention relates to a crash monitoring system for a vehicle that is equipped with an airbag, possibly with more than one airbags. The vehicle may in particular be a car, but may be any other vehicle equipped with one or more airbags for protecting the occupants of the vehicle in case of a crash event. The crash monitoring system according to the first aspect of the invention comprises an occupant monitoring system, an airbag pressure sensor, an airbag contact sensor and a processing unit.

The occupant monitoring system is configured for providing a mass value corresponding to a mass of the head of an occupant of the vehicle. The occupant monitoring system may provide the mass value by directly transmitting the mass value to the processing unit or by transmitting an information to the processing unit allowing the processing unit to obtain, compute or estimate the mass value.

The "mass value" may in particular be a mass value expressed in mass units such as kilograms that identically corresponds to a measurement or an estimation of the mass of the head of the occupant or may be related thereto, for instance by a known mathematical function.

The occupant monitoring system may for example provide the mass value by direct measurement and/or by calculation or estimation based on one or more measurement values. For example, the occupant monitoring system may comprise a camera configured for obtaining images of the occupant of the vehicle, in particular of the head of the occupant of the vehicle. A mass value corresponding to the mass of the head of the occupant of the vehicle may then be obtained from an image of the head of the occupant, for example directly by a correspondingly trained AI algorithm or via look up tables related to one or more head parameters, such as a head diameter, a head width, a head height or the like, obtainable from the image of the head of the occupant by appropriate image recognition techniques.

Additionally or alternatively, the occupant monitoring system may for example comprise a weighting device configured for providing a weight value associated to the occupant of the vehicle, in particular a body weight of the occupant of the vehicle or an estimation thereof, which may be related to a corresponding partial mass of the head of the occupant of the vehicle, allowing to infer from the body weight a value of the corresponding mass of the head (mass value). Such a weighting device may for example be integrated in a vehicle seat occupied by the occupant of the vehicle.

Additionally or alternatively, the occupant monitoring system may for example comprise an input device configured for inputting, in particular by the occupant himself, biometric data of the occupant of the vehicle, for example using a keyboard, a touch pad, a touch screen or the like and/or via communication with a device carried by the occupant in which biometric data of the occupant may be stored, such as a wearable device or a smartphone. For example, the occupant may enter a body weight using a keyboard and the occupant monitoring system may use the body weight as biometric data and/or to infer from it the mass value. According to a further example, the occupant monitoring system may connect to a smartphone carried by the occupant, for instance via a Bluetooth or wireless connection, and may obtain biometric data of the occupant of the vehicle from the smartphone, from which the mass value may possibly be obtained or inferred.

The occupant monitoring system may further be configured for obtaining further biometric data (apart from the mass value) of the occupant of the vehicle, be it related to the head of the occupant or to any other part of the body of the occupant, in particular to an upper body part. "Biometric data" may refer herein to values indicative of one or more biometric characteristics of the occupant of the vehicle. The biometric data may for example comprise a height value corresponding to a body height, an age value corresponding to an age, a body weight value corresponding to a body weight, and/or a head dimension value corresponding to any of diameter, length, width and/or height of the head of the occupant of the vehicle, just to mention some examples.

The mass value and optionally other biometric data may be provided by the occupant monitoring system in real-time during a vehicle crash or at any other time preceding a vehicle crash or after a vehicle crash. For example, the occupant monitoring system may be configured for providing the mass value and optionally other biometric data upon detection of a crash situation. In other examples, the occupant monitoring system may be configured for providing the mass value and optionally other biometric data in regular time intervals irrespectively of whether a crash situation is detected and/or at predefined operation states of the vehicle, for instance every time a vehicle equipped with the crash monitoring system of the invention is started or exceeds a predefined driving speed and/or a predefined acceleration of the vehicle.

The airbag pressure sensor is configured for providing a pressure value corresponding to a gas pressure within the airbag(s) of the vehicle. The "pressure value" may in particular be a pressure value expressed in pressure units such as bar or Pa, which may correspond to a measurement or estimation of the pressure within the airbag or may be related thereto, for instance by a known mathematical function. In case of a crash event, the airbag of the vehicle is very rapidly inflated by a corresponding airbag control unit by providing a sufficient amount of gas to the airbag, typically resulting from a chemical reaction or a pressurised gas unleashed by the airbag control unit upon detection of a crash situation. The gas enters the airbag and creates a gas pressure therein that causes the airbag first to inflate, so as to prevent the head of the occupant from hitting any hard car components such as the steering wheel or the chassis of the vehicle, and then to controlled deflate, so as to prevent suffocation.

The airbag pressure sensor of the crash monitoring system of the invention may in particular be configured for providing a pressure value corresponding to a real-time gas pressure within the airbag of the vehicle. It is also possible for the airbag pressure sensor to provide a series of pressure values corresponding to a time evolution of the gas pressure within the airbag of the vehicle once a crash situation—triggering the inflation of the airbag—is detected.

The airbag pressure sensor may be integrated within the airbag, within an airbag inflation system and/or in the exterior of the airbag. For example, the airbag pressure sensor may comprise a pressure sensor integrated within the airbag and may be configured to directly measure a pressure within the airbag. Additionally or alternatively, the airbag pressure sensor may comprise a gas flow sensor integrated within or connected to the airbag inflation system and may be configured to directly measure a flow of gas into the airbag, from which a pressure within the airbag may be inferred. Additionally or alternatively, the airbag pressure sensor may comprise a camera configured for providing an image of the inflated airbag, from which a pressure within the airbag may be inferred.

The pressure value provided by the airbag pressure sensor may correspond to a gas pressure within the airbag in absolute terms, for example to a gas pressure of 20 kPa or of 30 kPa. However, the pressure value provided by the airbag pressure sensor may also correspond to a variation of gas pressure within the airbag, for example to a difference between a gas pressure within the airbag prior to contact with the head of the occupant of the vehicle and a maximum gas pressure registered during a crash event, which may in particular correspond to a maximum acceleration of the head of the occupant pressing against the airbag.

The airbag contact sensor is configured for providing a contact area value corresponding to a contact area at which the head of the occupant of the vehicle contacts the airbag of the vehicle. The "contact area value" may in particular be an area value expressed in units of area such as cm2, which may identically correspond to a measurement or estimation of the area at which the head of the occupant of the vehicle contacts the airbag of the vehicle or may be related thereto, for instance by a known mathematical function. In a crash event, the head of the occupant of the vehicle eventually reaches and contacts the inflated airbag and presses against the airbag. Depending on the position of the head of the occupant with respect to the airbag, the contact area may be of different sizes. The airbag contact sensor of the crash monitoring system of the invention is configured for providing a contact area value corresponding to such contact area.

In some embodiments, the airbag contact sensor may be configured for providing a contact area value corresponding to a contact area at which the head of the occupant of the vehicle contacts the airbag of the vehicle within a predefined time from a first contact of the head of the occupant of the vehicle with the airbag, for example within 0.1 s or 0.01 s of said first contact.

The airbag contact sensor may for example be or comprise a capacitive sensor allowing to relate a measured voltage to an area at which the airbag contact sensor undergoes a variation in (self)capacitance due to contact with the head of the occupant of the vehicle. In particular, a voltage drop may be measurable at areas corresponding to an area of contact of the head of the occupant of the vehicle with the airbag. The airbag contact sensor may in particular be or comprise a "tactile occupant detection sensor" as described in detail by the inventors of the present application in Shirur N, et al. *Effect of Airbag Deployment Phases on Tactile Occupant Detection Sensor, Conference Automotive Safety*, November 2020, Kielce (Poland).

The contact area value provided by the airbag contact sensor may thus correspond to a variation of voltage across the airbag contact sensor, for example to a difference between a reference voltage, which may in particular be an average voltage across the airbag contact sensor measured prior to contact with the head of the occupant of the vehicle, and an extremal voltage registered across the airbag contact sensor during a crash event, which may in particular correspond to a maximum acceleration of the head of the occupant pressing against the airbag and hence to a maximum area of contact. In some embodiments, the airbag contact sensor may be arranged at least in part on an interior surface of the airbag, such that when the airbag inflates, an exterior surface of the airbag overlying the interior surface of the airbag on which the airbag contact sensor is arranged faces the head of the occupant of the vehicle and covers an area of expected contact of the head with the airbag. Additionally or alternatively, the airbag contact sensor may be arranged at least in part on an exterior surface of the airbag, such that when the airbag inflates, an exterior surface of the airbag on which the airbag contact sensor is arranged faces the head of the occupant of the vehicle and covers an area of expected contact of the head with the airbag. For example, the airbag contact sensor may comprise a plurality of sensor units, some of which may be arranged on an interior surface of the airbag and some of which may be arranged on an exterior surface of the airbag.

The processing unit is connected to the occupant monitoring system, the airbag pressure sensor and the airbag contact sensor and is configured for providing an acceleration value corresponding to an acceleration of the head of the occupant of the vehicle based on the mass value, the pressure value and the contact area value. Since the pressure P exerted by the head of the occupant of the vehicle upon the airbag corresponds to a force F per unit of contact area A and such force F corresponds to the product of the mass m of the head of the occupant of the vehicle multiplied by the acceleration undergone by the head of the occupant of the vehicle, the acceleration value can for example be obtained according to the formula:

$$P = \frac{F}{A} = \frac{m \cdot a}{A} \rightarrow a = \frac{P \cdot A}{m}$$

Thus, the crash monitoring system of the invention allows obtaining an acceleration value corresponding to an acceleration undergone by the head of the occupant of the vehicle. As the inventors found out, such acceleration value can be employed for different advantageous purposes and the crash monitoring system of the invention allows obtaining it in real time, in a simple and reliable manner that is implementable in most existing vehicles with few necessary reconfigurations.

As an example, the inventors found out that the acceleration value can be used for reliably providing an injury criterion value indicative of the severity of the injuries suffered by the occupant of the vehicle as a consequence of the crash. This allows estimating an injury level of the occupant of the vehicle in real time. Notably, an injury criterion value can be obtained based on an acceleration value related to the acceleration undergone by the head of the occupant of the vehicle. However, it is possible to obtain an overall injury level—indicative not only of head injuries but of any other injuries in other body parts as well—based on the acceleration value. Such injury criterion value may be communicated to a remote recipient, in particular to emergency services, for example using an eCall system installed in the vehicle in order to enhance and expedite injury diagnosis and appropriate emergency medical care to the occupant of the vehicle after the crash.

As a further example, the acceleration value can be used for optimally adapting the operation of the airbag in real time, in particular a further inflation and/or a deflation thereof. In view of the acceleration value, it may for example be determined that it is recommendable to reach a given gas pressure value within the airbag, to hold an inflation state of the airbag for a given time, to redistribute pressure among different chambers of the airbag and/or to let pressure within the airbag to evolve following a given time evolution, and the crash monitoring system of the invention may provide such information to the corresponding airbag control system such that it can be used and implemented for optimising the operation of the airbag in real time.

According to preferred embodiments of the invention, the occupant monitoring system may comprise an image sensor, preferably a camera and/or a near-field radar. The image sensor may be mounted within the cockpit of the vehicle such that it has optical access to the occupant of the vehicle, which may be any of a plurality of occupants of the vehicle. The occupant monitoring system may further comprise or be connected to a mass estimation unit. The image sensor may be configured for obtaining at least one image of the head of the occupant of the vehicle and the mass estimation unit may be configured for providing the mass value based on the at least one image obtained by the image sensor. "Image" may refer herein to information about the occupant of the vehicle obtained by means of electromagnetic radiation in any part of the spectrum emitted and/or reflected by at least a part of the body of the occupant, which electromagnetic radiation may but needs not be in the visible part of the spectrum. For example, if the image sensor comprises a camera, the camera may be configured for obtaining the at least one image as visible image in the visible part of the spectrum. According to some embodiments the image sensor, for example the camera, may be configured for obtaining a series or sequence of images, for example a video. The mass estimation unit may comprise a processor containing a program code configured for analysing the at least one image obtained by the image sensor and for inferring from the at least one image the mass value.

For example, the mass estimation unit may comprise look up tables storing information about a relationship between mass values related to the mass of the head of an occupant and different parameters related to the head of an occupant that might be obtained from an image thereof, such as for example the width, height, length, and/or diameter of the head. Preferably, the mass estimation unit may be configured for providing the mass value based on the at least one image obtained by the camera using an AI algorithm. The AI algorithm may be properly trained on a sufficiently large dataset containing images of different heads of different shapes and sizes and associated values of the mass value. The mass estimation unit may further be configured for taking into account additional biometric data about the occupant of the vehicle in order to provide a better estimation of the mass value.

In preferred embodiments of the invention, the processing unit may further be configured for categorising the occupant of the vehicle based on the mass value, the pressure value and/or the contact area value. The processing unit may also take into account additional biometric data for categorising the occupant of the vehicle. Categorising the occupant of the vehicle means associating the occupant of the vehicle to one category out of a predetermined set of different categories. For example, the processing unit may be configured for categorising the occupant of the vehicle as adult or child. For that purpose, the processing unit may contain program code containing look up tables relating different values of the mass value, the contact area value, the pressure value and/or of any other biometric data processed by the processing unit to a corresponding category, for example to one of "adult" or "child".

According to preferred embodiments, the occupant monitoring system may be further configured for providing biometric data and the processing unit may further be configured for categorising the occupant of the vehicle based on the biometric data provided by the occupant monitoring system.

In preferred embodiments, the airbag contact sensor may be further configured for providing a contact time value corresponding to a contact time during which the head of the occupant of the vehicle contacts the airbag of the vehicle. The "contact time value" may in particular be a time value expressed in units of time such as seconds that corresponds to a measurement or estimation of a time lapsed between an initial contact of the head of the occupant with the airbag, in particular with the airbag contact sensor, which may be arranged on the airbag, and a current time. In other words, the "contact time value" may be an indication of the time over which the head of the occupant of the vehicle has been in contact with the airbag. Such time information may be used by the processing unit for providing the acceleration value, for example by combining it with a series of pressure values corresponding to a time evolution of the gas pressure within the airbag over a time corresponding to the contact time value or to a variation of gas pressure within the airbag over a time corresponding to the contact time value. Further, the contact time value may be indicative of whether the head of the occupant continues to be in contact with the airbag after a crash event and may hence provide information as to whether the occupant of the vehicle is conscious or not. For example, if the contact time value is indicative of a contact time longer than a predefined threshold, for example 60 seconds, unconsciousness of the occupant due to the crash may be assumed by the processing unit and possibly communicated via the communication unit.

In some preferred embodiments, the airbag contact sensor may be further configured for providing one or more position values corresponding to one or more positions at which the head of the occupant of the vehicle contacts the airbag of the vehicle. The "one or more position values" may in particular correspond to locations on the airbag that are in contact with the head of the occupant allowing to determine what part of the airbag, in particular of an external surface thereof, is in contact with the head of the occupant. Such information about the position of the head of the occupant on the airbag may allow determining the relative position of the head of the occupant with respect to the airbag. For example, based on the one or more position values, the processing unit may be configured to determine whether the head of the occupant is in an "in-position situation", i.e. in a position corresponding to an area of the airbag that has been specifically designed for contacting, in particular frontally contacting, the head of the occupant, or whether the head of the occupant is in an "out-of-position" situation, i.e. to a position with respect to the airbag not corresponding to a zone of the airbag that has been specifically designed for contacting, in particular frontally contacting, the head of the occupant. During the development and manufacturing of airbags, developers assume that the head of the occupant mainly contacts the airbag at a predetermined position or within a predetermined area. Knowing whether in a real crash situation the head of the occupant is in an in-position situation or in an out-of-position situation may be relevant for correctly assessing the resulting injury level and/or for efficiently determining an optimised airbag inflation and/or deflation scheme to be implemented by the airbag control unit. For example, in an out-of-position situation, more pressure may be necessary within the airbag to restrain the head of the occupant as compared to an in-position situation.

In preferred embodiments of the invention, the crash monitoring system may comprise or be connectable to a communication unit. The communication unit may be a part of the crash monitoring system configured for communicating with a remote server or communication recipient and/or may be any communication device with which the crash monitoring system is configured to establish a functional connection for using a communication capability. For example, the communication unit may correspond to an eCall system integrated in the vehicle or to a smartphone or to a wearable communication device carried by the occupant of the vehicle, to which the crash monitoring system may connect to establish communication with a remote recipient, in particular with rescue services. The crash monitoring system may be configured for communicating to a remote recipient, for example to rescue services, using the communication unit, the acceleration value or a related value.

As previously mentioned, the inventors found out that the acceleration value provided by the crash monitoring system of the invention allows reliably predicting in real time an injury level of the occupant in the immediate aftermath of an actual crash event. Thus, information about the acceleration value provided by the crash monitoring system of the invention may help rescue services optimising the required emergency actions for offering proper medical care to the occupant of the vehicle after the crash event. Preferably, the aforesaid related value may comprise an injury criterion value relating the acceleration value to an injury level of the occupant of the vehicle. "Injury level" may refer herein to a degree of severity of the injuries suffered by the occupant, such that a higher injury level may be indicative of more severe injuries and vice versa. For example, the injury criterion value may be or comprise a "head injury criterion" (HIC) that was standardised according to the US Federal Motor Vehicle Safety Standards (FMVSS) and/or to a value in the Abbreviated Injury Scale (AIS) created by the US Association for the Advancement of Automotive Medicine (AAAM). Using the acceleration undergone by the head of the occupant during a crash event expressed in units of g (the acceleration due to gravity), which can be obtained from the acceleration value provided by the processing unit of the crash monitoring system of the invention, for example the corresponding HIC can be obtained using the formula:

$$HIC = \max\left[\frac{1}{(t_2 - t_1)} \int_{t_1}^{t_2} a(t)dt\right]^{2.5} (t_2 - t_1)$$

With $t_1$ and $t_2$ being initial and final times (in seconds), respectively, chosen to minimize the HIC, wherein the time duration $(t_2 - t_1)$ is typically limited to a maximum value of 36 ms, preferably to 15 ms. The HIC scale has a range of 0 to 1600, with 1600 corresponding to mortal injuries and about 700 corresponding to the severity injury threshold. The HIC can be correlated with a value in the AIS, which provides an anatomical and biomechanical interpretation of the injuries, according to the following table:

TABLE 1

| AIS levels and injuries | | |
|---|---|---|
| AIS | Category | Injuries |
| 1 | Minor | Light brain injuries with headache, vertigo, no loss of consciousness, light cervical injuries, whiplash, abrasion, contusion. |
| 2 | Moderate | Concussion with or without skull fracture, less than 15 minutes unconsciousness, corneal tiny cracks, detachment of retina, face or nose fracture. |
| 3 | Serious | Concussion with or without skull fracture, less than 15 minutes unconsciousness without severe neurological damages closed and shifted or impressed skull fracture without unconsciousness or other injury indications in skull, loss of vision, shifted and/or open face bone fracture with antral or orbital implications, cervical fracture without damage of spinal cord. |

TABLE 1-continued

AIS levels and injuries

| AIS | Category | Injuries |
|---|---|---|
| 4 | Severe | Closed and shifted or impressed skull fracture with severe neurological injuries. |
| 5 | Critical | Concussion with or without Skull fracture with more than 12 hours unconsciousness with haemorrhage in skull and/or critical neurological indications. |
| 6 | Survival not sure | Death, partly or fully damage of brainstem or upper part of cervical due to pressure or disruption, Fracture and/or wrench of upper part of cervical with injuries of spinal cord. |

A graphic illustrating the correspondence between AIS level and HIC value is shown in FIG. 1.

The processing unit of the crash monitoring system of the invention may be configured for computing an HIC value in regular time intervals corresponding to the integration time $(t_2-t_1)$ in the above formula and for selecting, out of all HIC values computed for a given crash event, a maximum HIC value.

The processing unit of the crash monitoring system of the invention may be configured for communicating to a remote recipient, using the communication unit, an HIC value, which may in particular correspond to the aforementioned maximum HIC value, and/or an AIS level, which may in particular correspond to such HIC value, computed in either case from the acceleration value provided by the processing unit based on the mass value, the pressure value and the contact area value respectively provided by the occupant monitoring system, the airbag pressure sensor and the airbag contact sensor.

A second aspect of the invention relates to an airbag system for a vehicle comprising at least one airbag and a crash monitoring system according to any of the embodiments of the first aspect of the invention. The occupant monitoring system of the crash monitoring system is configured for providing a mass value corresponding to a mass of the head of an occupant of the vehicle. The airbag pressure sensor of the crash monitoring system is configured for providing a pressure value corresponding to a gas pressure within the at least one airbag. The airbag contact sensor of the crash monitoring system is configured for providing a contact area value corresponding to a contact area at which the head of the occupant of the vehicle contacts the at least one airbag. The processing unit is connected to the occupant monitoring system, the airbag pressure sensor and the airbag contact sensor of the crash monitoring system and is configured for providing an acceleration value corresponding to an acceleration of the head of the occupant of the vehicle based on a mass value provided by the occupant monitoring system, the pressure value provided by the airbag pressure sensor, and the contact area value provided by the airbag contact sensor. The crash monitoring system of the airbag system of the second aspect of the invention may be configured to operate according to any of the previously discussed embodiments of the crash monitoring system according to the first aspect of the invention.

In preferred embodiments, the airbag system may further comprise an airbag control unit configured for controlling one or more parameters of the at least one airbag. The one or more parameters of the at least one airbag may in particular be or comprise parameters determining a behaviour and/or a time evolution of the at least one airbag, for example a gas pressure of the at least one airbag, a maximum gas pressure of the at least one airbag, a time evolution of the gas pressure of the at least one airbag, a maximum pressure of the at least one airbag, an airbag chambers inflation scheme, an inflation time/velocity and/or a deflation time/velocity of the at least one airbag, just to mention some examples. "Airbag chambers inflation scheme" may refer to an internal distribution of gas pressure within different chambers of the at least one airbag. For example, an airbag chambers inflation scheme may determine that one of the at least one airbag comprising four internal chambers should be inflated such that two of the airbag chambers are inflated more rapidly and/or reaching a higher maximum pressure than the other two of the airbag chambers. The airbag control unit may be connected to the at least one airbag and to the crash monitoring system and may be configured for controlling said one or more parameters of the at least one airbag based on the acceleration value provided by the processing unit of the crash monitoring system, optionally further based on additional biometric data provided by the processing unit of the crash monitoring system.

The airbag control unit and its functional connection with the crash monitoring system hence exploits the benefits of the first aspect of the invention to control the operation of the at least one airbag in an optimised manner such as to provide airbag protection that is tailored in real time to the actual crash situation of the respective occupant of the vehicle.

A third aspect of the present invention refers to a vehicle comprising a crash monitoring system according to any of the embodiments of the first aspect of the invention and/or an airbag system according to any of the embodiments of the second aspect of the invention. The vehicle may in particular be a car, but can be any other vehicle equipped with at least one airbag, for example a motorbike.

A fourth aspect of the invention refers to a method of providing an acceleration value corresponding to an acceleration of the head of an occupant of a vehicle in a crash situation, preferably in real time. The method comprises:

providing, by an occupant monitoring system, a mass value corresponding to a mass of the head of the occupant of the vehicle, providing, by an airbag pressure sensor, a pressure value corresponding to a gas pressure within at least one airbag of the vehicle, providing, by an airbag contact sensor, a contact area value corresponding to a contact area at which the head of the occupant of the vehicle contacts the at least one airbag of the vehicle, and generating, by a processing unit, the acceleration value based on the mass value, the pressure value and the contact area value.

The method may be a computer implemented method. The method according to the fourth aspect of the invention may be implemented by an airbag system according to any of the embodiments of the second aspect of the invention and/or by a crash monitoring system according to any of the embodiments of the first aspect of the invention. Thus, the occupant monitoring system used for providing the mass value, the airbag pressure sensor used for providing the pressure value, and the airbag contact sensor used for providing the contact area value may respectively correspond to an occupant monitoring system, an airbag pressure sensor and an airbag contact sensor of an airbag system or a crash monitoring system according to any of the previously described embodiments of the invention and may implement the corresponding functionalities as part of the method.

Preferably, the acceleration value may be provided based on the formula $$a = \frac{P \cdot A}{m},$$

with a being the acceleration value or a related value, P being the pressure value or a related value, A being the contact area value or a related value and m being the mass value or a related value.

In some embodiments, providing the mass value may comprise estimating the mass of the head of the occupant of the vehicle, preferably using an AI algorithm.

In some preferred embodiments, providing the pressure value may comprise providing a measurement of a gas pressure within the at least one airbag.

In some preferred embodiments, providing the contact area value may comprise providing a voltage variation and/or a capacitance variation registered by at least one capacitive sensor of the airbag contact sensor.

The invention further refers to a storage medium containing program code which, when executed by a processor, causes the processor to carry out the steps of the method according to any of the embodiments of the fourth aspect of the invention.

DETAILED DESCRIPTION OF PREFERRED EMBODIMENTS OF THE INVENTION

Figure 1:
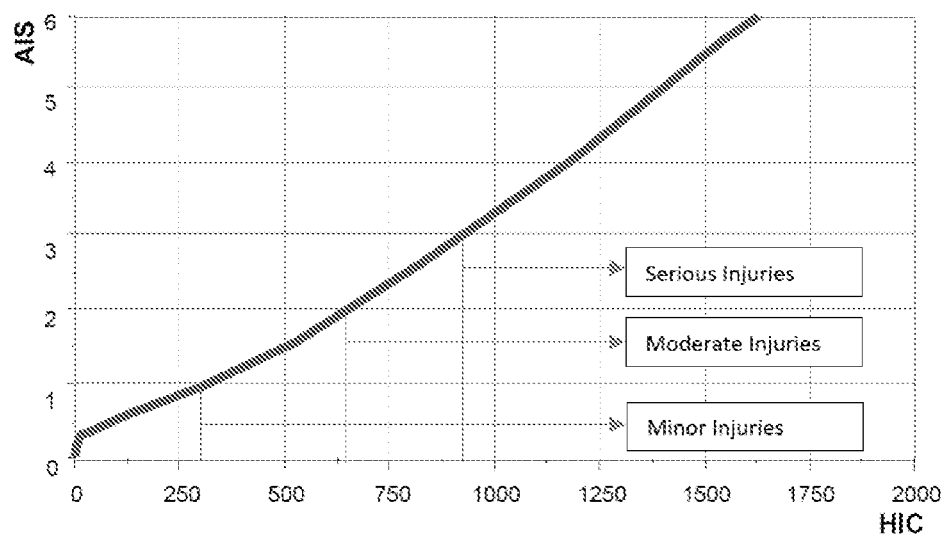
FIG. 1 shows an exemplary graphic of a correspondence between HIC value and AIS level.

For the purposes of promoting an understanding of the principles of the invention, reference will now be made to specific preferred embodiments illustrated in the drawings, and specific language will be used to describe the same. It will nevertheless be understood that no limitation of the scope of the invention is thereby intended, such alterations and further modifications in the illustrated apparatus and such further applications of the principles of the invention as illustrated therein being contemplated as would normally occur now or in the future to someone skilled in the art to which the invention relates within the scope defined by the claims.

FIG. 1 shows an exemplary graphic of the correspondence between the levels in the AIS scale and HIC values—determined based on a mass value provided by a crash monitoring system according to the present invention—using the formula:

$$HIC = \max\left[\frac{1}{(\Delta t)}\int_{t}^{t+\Delta t} a(t)dt\right]^{2.5}(\Delta t)$$

wherein a(t) is the acceleration value generated by the processing unit of the crash monitoring system and $\Delta t$ is set as a predefined time lapse of 0.015 s. The processing unit can be configured for discretising a(t) using a series of successive acceleration values obtained by the processing unit during a crash event and/or for assuming a constant value of a(t)=a corresponding to a given acceleration value over the integration time $\Delta t$ or at least a part thereof.

As seen in the graphic of FIG. 1, an HIC value of up to about 300 corresponds to an AIS level of about 1.0 which is indicative of minor injuries suffered by the occupant. An HIC value of about 700 corresponds to an AIS level of about 2.0, which is indicative of moderate injuries of the occupant of the vehicle. An HIC value of about 900 corresponds to an AIS level of about 3.0, which is indicative of serious injuries suffered by the occupant of the vehicle (see table 1).

Figure 2:
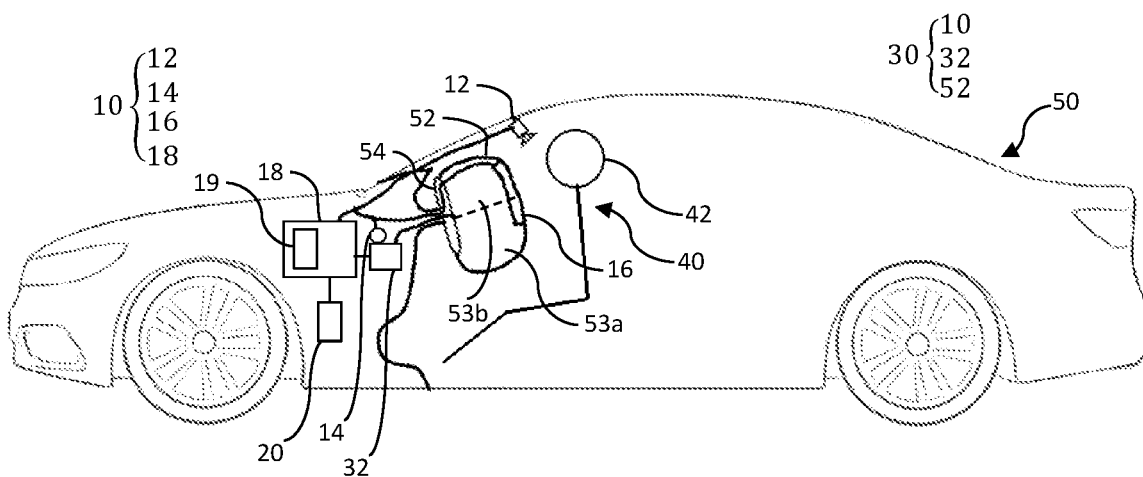
FIG. 2 shows a schematic illustration of a vehicle comprising an airbag system according to the second aspect of the invention, which includes a crash monitoring system according to the first aspect of the invention.

FIG. 2 shows a schematic view of a vehicle 50 that comprises an airbag system 30 according to the second aspect of the present invention. The airbag system 30 comprises an airbag 52 of the vehicle 50 and an airbag control unit 32 that is functionally connected with the airbag 52 and configured for controlling the operation thereof. The airbag control unit 32 can trigger the inflation of the airbag 52 when a crash event is detected and then controls a flow of inflation gas into the airbag 52, in particular an inflation velocity and a gas pressure within the airbag 52. In the exemplary embodiment shown, only one airbag 52 is exemplarily referred to. However, the vehicle safety may comprise more than one airbag and the principles of the present invention as exemplified with respect to the embodiment shown in FIG. 2 may be equally applied to a larger number of airbags of the vehicle 50. The airbag 52 is a multi-chamber airbag that is internally divided in a first airbag chamber 53a and a second airbag chamber 53b. In other embodiments, the airbag 52 may have a larger number of internal chambers but can also be a one-chamber airbag. The airbag control unit 32 can be configured for individually controlling inflation conditions and gas pressure of each of the airbag chambers 53a and 53b.

The airbag system 30 further comprises a crash monitoring system 10. The crash monitoring system 10 comprises an occupant monitoring system 12, an airbag pressure sensor 14, an airbag contact sensor 16 and a processing unit 18.

The occupant monitoring system 12 is implemented in the exemplary embodiment illustrated in FIG. 2 as a camera that is mounted in the interior of the cockpit of the vehicle 50 and has optical access to the head 42 of an occupant 40 of the vehicle 50, which in this case is the driver of the vehicle 50. The camera of the occupant monitoring system 12 can obtain images of the head 42 of the occupant 40. In related embodiments, the camera of the occupant monitoring system 12 and/or other cameras of the occupant monitoring system 12 can be configured for obtaining images of other occupants of the vehicle, such as the co-driver and the rear passengers.

The airbag pressure sensor 14 is functionally connected to the airbag control unit 32 and is configured for measuring a gas pressure within the airbag 52. In other related embodiments, the airbag pressure sensor 14 can be installed within the airbag 52.

The airbag contact sensor 16 is implemented as an array of capacitive sensors, each corresponding to a "tactile occupant detection sensor" as described in detail by the inventors of the present application in Shirur N, et al. *Effect of Airbag Deployment Phases on Tactile Occupant Detection Sensor*, Conference Automotive Safety, November 2020, Kielce (Poland). The airbag contact sensor 16 is arranged on an interior surface of the airbag 52, such that when the airbag 52 inflates, an exterior surface of the airbag overlying the airbag contact sensor 16 faces the head 42 of the occupant 40 and covers an area of expected contact of the head 42 with the airbag 52.

The occupant monitoring system 12, the airbag pressure sensor 14 and the airbag contact sensor 16 are all connected with the processing unit 18 that is installed in the vehicle 50, for example integrated in the board computer of the vehicle 50.

The airbag pressure sensor 14 can provide to the processing unit 18 a pressure value corresponding to the gas pressure within the airbag 52 measured by the airbag pressure sensor 14. The occupant monitoring system 12 is configured for obtaining one or more images of the head 42 of the occupant 40 and for transmitting them to a mass estimation unit 19, which in the embodiment shown in FIG. 2 is included in the processing unit 18 and contains an AI algorithm trained to infer, from the at least one image of the head 42 provided by the camera of the occupant monitoring system 12, an estimation of the mass of the head 42, which is provided to the processing unit 18. In other related embodiments, the mass estimation unit 19 can be integrated in the occupant monitoring system 12, which then can transmit the mass value to the processing unit 18, without necessarily transmitting the one or more images obtained by the camera of the occupant monitoring system 12 to the processing unit 18.

The occupant monitoring system 12 can further be configured for providing additional biometric data about the occupant 40, for example an image measurement from which the processing unit 18 (or a processor integrated in the occupant monitoring system 12) can obtain an estimation of the body height of the occupant 40.

Using the mass value provided by the mass estimation unit 19 and optionally further using the estimation of the body height of the occupant 40 provided by the occupant monitoring system 12 and possibly any additional biometric data, the processing unit 18 can categorise the occupant 40, for example as an adult or as a child. For instance, if the processing unit 18 estimates that the mass of the head of the occupant 40 is below 4 kg and the body height of the occupant is estimated to be below 140 cm, the processing unit 18 categorises the occupant 40 as a child. Otherwise, the processing unit 18 categorises the occupant 40 as an adult.

When the head 42 of the occupant 40 contacts the airbag contact sensor 16 during a crash event, the capacitance of the airbag contact sensor 16 undergoes a sudden variation that can be detected by a detection circuit as a corresponding voltage variation in the voltage between the terminals of the capacitive sensor. Using a calibration curve as the one shown in FIG. 3, it is possible to correlate a voltage variation registered by the capacitive sensors of the airbag contact sensor 16 with the contact area at which the head 42 of the occupant 40 contacts the airbag contact sensor 16 during a crash event. Such calibration may be performed by a manufacturer of the crash monitoring system 10 before or during its installation in the vehicle 50. Thus, the airbag contact sensor 16 can provide to the processing unit 18 a contact area value that corresponds to a contact area at which the head 42 of the occupant 40 of the vehicle 50 contacts the airbag 52.

The airbag contact sensor 16 can be further configured for measuring and providing to the processing unit 18 a contact time value corresponding to a contact time during which the head 42 of the occupant 40 contacts the airbag 52. Further, the airbag contact sensor 16, which in the exemplary embodiment under consideration comprises a plurality of capacitive sensors distributed over the external surface of the airbag 52, can provide to the processing unit 18 a plurality of position values corresponding to a plurality of positions at which the head 42 of the occupant 40 contacts the airbag 52, thereby allowing the processing unit 18 to determine whether the head 42 contacts the airbag 52 according to an in-position situation or to an out-of-position situation.

Using all the information received from the occupant monitoring system 12, the airbag pressure sensor 14, and the airbag contact sensor 16, the processing unit 18 uses the estimated mass m of the head 42 of the occupant 40, the pressure value P and the contact area value A to generate an acceleration value a that is indicative of the acceleration undergone by the head 42 of the occupant 40 during the crash, for example using the formula:

$$a = \frac{P \cdot A}{m}$$

Figure 3:
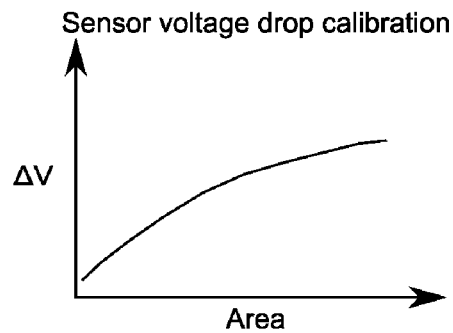
FIG. 3 shows an exemplary graphic of the calibration of an airbag contact sensor determining a relationship between an area value and a voltage drop registered by a capacitive sensor of the airbag contact sensor.

The acceleration value a can be obtained using the aforementioned formula and a calibration curve like the exemplary calibration curve illustrated in FIG. 3 for a corresponding value of the voltage variation $\Delta V$ registered by the airbag contact sensor 16, the gas pressure variation $\Delta P$ within the airbag 52 indicated by the pressure value provided by the airbag pressure sensor 14 and a mass of the head 42 of the occupant 40 indicated by the mass value provided by the occupant monitoring system 12, which may for example be m=6.81 kg.

Figure 6:
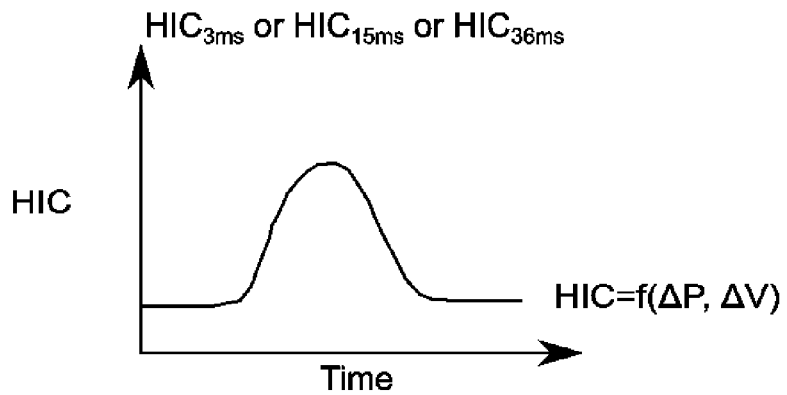
FIG. 6 shows an exemplary graphic of the time evolution of an HIC value during a crash event.

The acceleration value is generated by the processing unit 18 as previously explained or a related value indicative of an injury level of the occupant 40, for example an HIC value is computed by the processing unit 18 using the formula:

$$HIC = \max\left[\frac{1}{(\Delta t)}\int_{t}^{t+\Delta t} a(t)dt\right]^{2.5}(\Delta t)$$

wherein a is the acceleration of the head 42 determined by the processing unit 18 (which may identically correspond to the acceleration value or be a value derivable therefrom) and Δt is set as a predefined time lapse depending on which HIC value is required (e.g. Δt=3 ms for computing $HIC_{3\ ms}$, Δt=15 ms for computing $HIC_{15\ ms}$, Δt=36 ms for computing $HIC_{36\ ms}$). For example, using the above formula for HIC and assuming, for each integration, a constant value of the acceleration a(t)=a over the integration time lapse Δt, a series of HIC values is-obtained in regular time intervals corresponding to the integration time Δt and the maximum HIC value out of all computed HIC values is selected as an HIC value to be sent or reported.—FIG. 6 shows a schematic exemplary time evolution of the HIC value computed or computable as a function of the voltage variation ΔV registered by the airbag contact sensor 16, the gas pressure variation ΔP of the airbag 52 indicated by the pressure value provided by the airbag pressure sensor 14 and the mass of the head 42 of the occupant 40 indicated by the mass value provided by the occupant monitoring system 12 over time during a crash event.

The processing unit 18 is connected to a communication unit 20, which in the exemplary embodiment illustrated in FIG. 2 corresponds to an eCall function of the vehicle 50, which allows the crash monitoring system 10 to send to a remote recipient, for example an emergency rescue service, the acceleration value and/or the HIC value determined for the acceleration value. If only the acceleration value is transmitted, the correlation of the acceleration value with a corresponding injury level of the occupant 40 can be performed by the remote recipient.

In addition, the processing unit 18 is connected with the airbag control unit 32 and is configured for controlling the airbag control unit 32 such that the inflation and/or the deflation of the airbag 52 by the airbag control unit 32 is performed in an optimal manner taking into account the acceleration value obtained by the processing unit 18 of the crash monitoring system 10. For example, if the processing unit 18 categorises the occupant 40 as an adult and detects that the mass of the head 42 is greater than an average adult head and/or that the contact area of the head 42 with the airbag contact sensor 16 corresponds to an out-of-position situation, the processing unit 18 can control the airbag control unit 32 to provide a higher pressure to the airbag 52 in order to offer a more appropriate cushioning to the occupant 40. It is also possible that the processing unit 18 determines that a higher gas pressure must be provided to the first internal chamber 53a than to the second internal airbag chamber 53b or the other way around and/or that the first internal airbag chamber 53a must inflate faster than the second internal airbag chamber 53b or the other way around.

Figure 7:
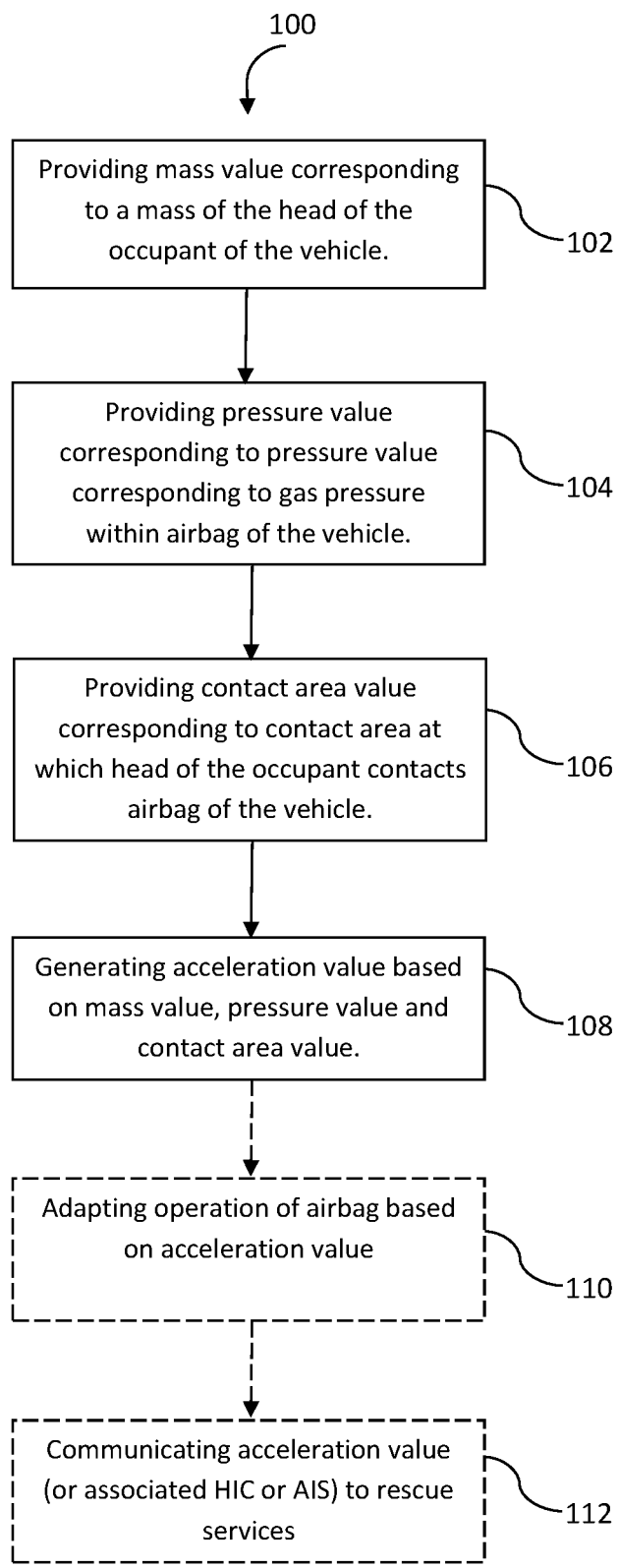
FIG. 7 is a flow diagram illustrating a method according to the fourth aspect of the invention.

FIG. 7 is a flow diagram schematically illustrating a method 100 of providing an acceleration value corresponding to an acceleration of the head 42 of the occupant 40 of the vehicle 50 in a crash situation. Notably, the steps 102, 104 and 106 may be performed in any order or simultaneously.

At 102, the occupant monitoring system 12 provides the mass value corresponding to the mass of the head 42 of the occupant 40. This may comprise obtaining an image of the head 42 by the camera of the occupant monitoring system 12 and using the AI algorithm of the mass estimation unit 19 for estimating the mass of the head 42 of the occupant 40 based on the image of the head 42.

Figure 5:
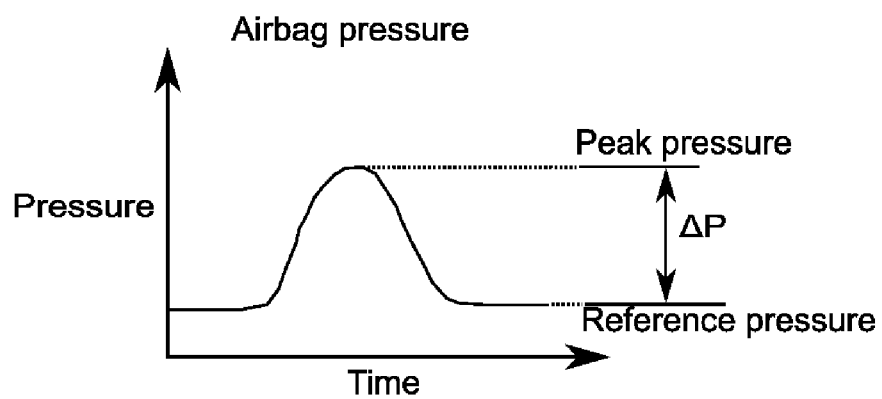
FIG. 5 shows an exemplary graphic of the gas pressure within the airbag measured by the airbag pressure sensor.

At 104, the airbag pressure sensor 14 provides the pressure value corresponding to the gas pressure within the airbag 52. This can comprise directly measuring or estimating the gas pressure within the airbag 52. FIG. 5 illustrates an exemplary graphic corresponding to the registration of a pressure variation by the airbag pressure sensor 14 over time during a crash event. A difference between a reference pressure, which can for example be an average gas pressure in the airbag 52 before the head 42 of the occupant 40 contacts the airbag 52, and a peak pressure, i.e. a maximum pressure registered when the head 42 of the occupant 40 contacts the airbag 52, can be provided as the pressure value. In the example shown in FIG. 5, the pressure value can for example be of 0.042 bar=4200 Pa.

Figure 4:
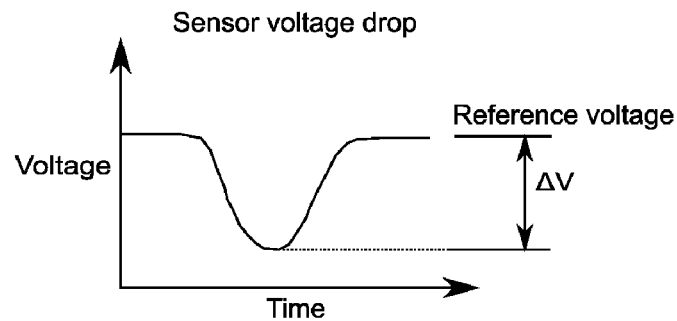
FIG. 4 shows an exemplary graphic of a voltage drop registered by a capacitive sensor of the airbag contact sensor during a crash event.

At 106, the airbag contact sensor 16 provides the contact area value corresponding to the contact area at which the head 42 of the occupant 40 contacts the airbag 52. As previously mentioned, this can comprise using a capacitive sensor or a plurality thereof to detect a voltage variation which, using the calibration data shown in FIG. 3, can be used to provide the corresponding contact area value. FIG. 4 shows an exemplary graphic illustrating a voltage variation that can be registered by the capacitive sensor of the airbag contact sensor 16 over time during a crash event between a reference voltage, which can for example be an average voltage before the head 42 of the occupant 40 contacts the airbag 52, and a peak voltage, which can be an extremal (minimum in the example illustrated in FIG. 4) voltage registered when the head 42 of the occupant 40 contacts the airbag 52 with maximum pressure/acceleration during the crash. For example, the voltage variation between the reference voltage and the peak voltage can be 2.625 V, which according to the calibration table of FIG. 3, can for example correspond to a contact area of 0.01534 m², which can be the corresponding contact area value provided to the processing unit 18.

At 108, the processing unit 18 uses the mass value m, the pressure value P and the contact area value A to generate the corresponding acceleration value a, for example using the formula $$a = \frac{P \cdot A}{m}$$

The method further comprises optional steps 110 and 112. At 110, the acceleration value generated by the processing unit 18 is used for controlling an operation of the airbag 52, in particular by the airbag control unit 32 based on the acceleration value. At 112, the acceleration value generated by the processing unit 18—or a related value such as an associated HIC value or AIS level—is communicated to a remote recipient, in particular to an emergency rescue service, for example using the communication unit 20.

Referring to the exemplary time evolution of the HIC value illustrated in FIG. 6, which can be any of an $HIC_{3\ ms}$, an $HIC_{15\ ms}$ or an $HIC_{35\ ms}$ value, the HIC value that is communicated to the remote recipient by the processing unit 18 can in particular correspond to a peak or maximum HIC value selected out of a series of HIC values computed or computable over time during a crash event.

Although preferred exemplary embodiments are shown and specified in detail in the drawings and the preceding specification, these should be viewed as purely exemplary and not as limiting the invention. It is noted in this regard that only the preferred exemplary embodiments are shown and specified, and/or variations and modifications should be protected that presently or in the future lie within the scope of protection of the invention as defined in the claims.

What is claimed is:

1. A crash monitoring system for a vehicle equipped with an airbag, the system comprising:
   an occupant monitoring system configured for providing a mass value corresponding to a mass of the head of an occupant of the vehicle;
   an airbag pressure sensor configured for providing a pressure value corresponding to a gas pressure within the airbag of the vehicle;
   an airbag contact sensor configured for providing a contact area value corresponding to a contact area at which the head of the occupant of the vehicle contacts the airbag of the vehicle; and
   a processing unit connected to the occupant monitoring system, the airbag pressure sensor and the airbag contact sensor and configured for providing an acceleration value corresponding to an acceleration of the head of the occupant of the vehicle based on the mass value, the pressure value and the contact area value, wherein the acceleration value is used to control one or more parameters of the airbag.

2. The crash monitoring system of claim 1, wherein the occupant monitoring system comprises an image sensor, wherein the occupant monitoring system comprises or is connected to a mass estimation unit, wherein the image sensor is configured for obtaining at least one image of the head of the occupant of the vehicle and the mass estimation unit is configured for providing the mass value based on the at least one image obtained by the image sensor.

3. The crash monitoring system of claim 2, wherein the processing unit is further configured for categorising the occupant of the vehicle based on the mass value, the pressure value and/or the contact area value.

4. The crash monitoring system of claim 1, wherein the occupant monitoring system is further configured for providing biometric data, and wherein the processing unit is further configured for categorising the occupant of the vehicle based on the biometric data provided by the occupant monitoring system.

5. The crash monitoring system of claim 1, wherein the airbag contact sensor is further configured for providing a contact time value corresponding to a contact time during which the head of the occupant of the vehicle contacts the airbag of the vehicle.

6. The crash monitoring system of claim 1, wherein the airbag contact sensor is further configured for providing one or more position values corresponding to one or more positions at which the head of the occupant of the vehicle contacts the airbag of the vehicle.

7. The crash monitoring system of claim 1, wherein the crash monitoring system further comprises or is connectable to a communication unit, and wherein the crash monitoring system is configured for communicating to a remote recipient, using the communication unit, the acceleration value or a related value.

8. An airbag system for a vehicle comprising:
   at least one airbag; and
   a crash monitoring system comprising:
   an occupant monitoring system configured for providing a mass value corresponding to a mass of the head of an occupant of the vehicle;
   an airbag pressure sensor configured for providing a pressure value corresponding to a gas pressure within the airbag of the vehicle;
   an airbag contact sensor configured for providing a contact area value corresponding to a contact area at which the head of the occupant of the vehicle contacts the airbag of the vehicle; and
   a processing unit connected to the occupant monitoring system, the airbag pressure sensor and the airbag contact sensor and configured for providing an acceleration value corresponding to an acceleration of the head of the occupant of the vehicle based on the mass value, the pressure value and the contact area value,
   wherein the occupant monitoring system of the crash monitoring system is configured for providing a mass value corresponding to a mass of the head of an occupant of the vehicle,
   wherein the airbag pressure sensor of the crash monitoring system is configured for providing a pressure value corresponding to a gas pressure within the at least one airbag,
   wherein the airbag contact sensor of the crash monitoring system is configured for providing a contact area value corresponding to a contact area at which the head of an occupant of the vehicle contacts the at least one airbag, and
   wherein the processing unit is connected to the occupant monitoring system, the airbag pressure sensor and the airbag contact sensor of the crash monitoring system and is configured for providing an acceleration value corresponding to an acceleration of the head of the occupant of the vehicle based on a mass value provided by the occupant monitoring system, the pressure value provided by the airbag pressure sensor, and the contact area value provided by the airbag contact sensor, wherein the acceleration value is used to control one or more parameters of the at least one airbag.

9. The airbag system of claim 8, further comprising an airbag control unit configured for controlling the one or more parameters of the at least one airbag, wherein the airbag control unit is connected to the at least one airbag and to the crash monitoring system.

10. A method of providing an acceleration value corresponding to an acceleration of the head of an occupant of a vehicle in a crash situation, the method comprising:
    providing, by an occupant monitoring system, a mass value corresponding to a mass of the head of the occupant of the vehicle;
    providing, by an airbag pressure sensor, a pressure value corresponding to a gas pressure within at least one airbag of the vehicle;
    providing, by an airbag contact sensor, a contact area value corresponding to a contact area at which the head of the occupant of the vehicle contacts the at least one airbag of the vehicle; and
    generating, by a processing unit, the acceleration value based on the mass value, the pressure value and the contact area value, wherein the acceleration value is used to control one or more parameters of the at least one airbag.

11. The method of claim 10, wherein acceleration value is generated based on the formula $a=(P \cdot A)/m$, with a being the acceleration value, P being the pressure value, A being the contact area value and m being the mass value.

12. The method of claim 10, wherein providing the mass value comprises estimating the mass of the head of the occupant of the vehicle.

13. The method of claim 10, wherein providing the pressure value comprises providing a measurement of a gas pressure within the at least one airbag.

14. The method of claim 10, wherein providing the contact area value comprises providing a voltage variation and/or a capacitance variation registered by at least one capacitive sensor of the airbag contact sensor.

15. The crash monitoring system of claim 1, wherein the processing unit is further configured for categorising the occupant of the vehicle based on the mass value, the pressure value and/or the contact area value.

16. The crash monitoring system of claim 2, wherein the image sensor comprises a camera or a near-filed radar.

17. The crash monitoring system of claim 2, wherein the mass estimation unit is configured for providing the mass value based on the at least one image obtained by the image sensor using an AI algorithm.

18. The crash monitoring system of claim 7, wherein the related value comprises an injury criterion value relating the acceleration value to an injury level of the occupant of the vehicle.

19. The airbag system of claim 9, wherein the one or more parameters comprise a gas pressure of the corresponding airbag, a maximum gas pressure, an airbag inflation velocity, an airbag deflation velocity and/or an airbag chambers inflation scheme.

20. The method of claim 13, wherein the mass of the head of the occupant of the vehicle is estimated using an AI algorithm.

\* \* \* \* \*